US012579895B2

(12) United States Patent
De et al.

(10) Patent No.: US 12,579,895 B2
(45) Date of Patent: Mar. 17, 2026

(54) GUIDED LANDING WITH UAVS

(71) Applicant: INTERNATIONAL BUSINESS MACHINES CORPORATION, Armonk, NY (US)

(72) Inventors: Radha Mohan De, Howrah (IN); Suman Patra, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 165 days.

(21) Appl. No.: 18/491,796

(22) Filed: Oct. 22, 2023

(65) Prior Publication Data

US 2025/0131830 A1 Apr. 24, 2025

(51) Int. Cl.

| | |
|---|---|
| *G08G 5/30* | (2025.01) |
| *G08G 5/25* | (2025.01) |
| *G08G 5/50* | (2025.01) |
| *G08G 5/55* | (2025.01) |
| *G08G 5/74* | (2025.01) |
| *G08G 5/76* | (2025.01) |

(52) U.S. Cl.

CPC ................. *G08G 5/25* (2025.01); *G08G 5/30* (2025.01); *G08G 5/50* (2025.01); *G08G 5/55* (2025.01); *G08G 5/74* (2025.01); *G08G 5/76* (2025.01)

(58) Field of Classification Search

CPC .. G08G 5/25; G08G 5/30; G08G 5/50; G08G 5/55; G08G 5/74; G08G 5/76; G08G 5/21; G08G 5/22; G08G 5/26; G08G 5/54; G08G 5/57

USPC .......................................................... 701/120

See application file for complete search history.

(56) References Cited

U.S. PATENT DOCUMENTS

| | | | | |
|---|---|---|---|---|
| 9,886,862 | B1 * | 2/2018 | Burgess | G06F 3/167 |
| 2008/0154447 | A1 * | 6/2008 | Spinelli | G05D 1/105 701/16 |
| 2016/0293018 | A1 | 10/2016 | Kim et al. | |

(Continued)

FOREIGN PATENT DOCUMENTS

| | | |
|---|---|---|
| CN | 109613929 B | 11/2022 |
| KR | 20210151292 A | 12/2021 |

OTHER PUBLICATIONS

Marcellin, F., “Good drones: the UAVs changing airport operations for the better,” [online] Airport Technology, © Verdict Media Limited 2023, Feb. 27, 2020, retrieved from the Internet: <https://www.airport-technology.com/features/positive-uses-of-drones-in-aviation/>, 9 pg.

(Continued)

*Primary Examiner* — B M M Hannan

(74) *Attorney, Agent, or Firm* — Harrity & Harrity, LLP

(57) ABSTRACT

One or more unmanned aerial vehicles (UAVs) having a ground map stored therein are employed to assist an aircraft in landing at an airfield. A determination is made that the aircraft requires assistance landing at the airfield. Instructions are sent to the one or more UAVs to synchronize a flight path with the aircraft. The one or more UAVs receive sensor data regarding conditions surrounding the aircraft and the airfield. The aircraft is controlled by the one or more based upon the ground map, the flight characteristic profile, and the group map. The controlling of the aircraft by the one or more UAVs is discontinued upon the aircraft landing at the airfield.

20 Claims, 4 Drawing Sheets

(56) References Cited

U.S. PATENT DOCUMENTS

| | | | | |
|---|---|---|---|---|
| 2017/0225800 | A1* | 8/2017 | Holt | B64U 70/80 |
| 2018/0181125 | A1* | 6/2018 | Ceccom | G08G 5/57 |
| 2018/0222583 | A1* | 8/2018 | Parks | B64C 19/00 |
| 2021/0209953 | A1 | 7/2021 | Zhou et al. | |
| 2021/0263537 | A1* | 8/2021 | Belt | G08G 5/26 |
| 2021/0358311 | A1 | 11/2021 | Tantardini et al. | |
| 2022/0148442 | A1* | 5/2022 | Ladurini | G08G 5/57 |
| 2022/0189324 | A1* | 6/2022 | Singh | G08G 5/54 |
| 2024/0201696 | A1* | 6/2024 | Mooney | G05D 1/633 |
| 2024/0361123 | A1* | 10/2024 | Hagag Osman | G06T 7/292 |

OTHER PUBLICATIONS

Wu, W. et al., Unmanned aerial vehicle swarm-enabled edge computing: Potentials, promising technologies, and challenges, [online] iEEE Wireless Communications, May 6, 2022, vol. 29, No. 4, pp. 78-85.

Chen, W. et al., "When UAV swarm meets edge-cloud computing: The QoS perspective," IEEE Network. Mar. 27, 2019, vol. 33, No. 2, pp. 36-43.

Mell, P. et al., The NIST Definition of Cloud Computing, National Institute of Standards and Technology, U.S. Dept. of Commerce, Special Publication 800-145, Sep. 2011, 7 pg.

* cited by examiner

GUIDED LANDING WITH UAVS

BACKGROUND

The present invention relates to airborne flight control systems, and more specifically, to employing unmanned aerial vehicles (UAV) to assist an aircraft during landing.

Historically, landing and takeoffs are the most dangerous and complex phase of flight for all aircraft. Over half of aircraft crashes occur during the landing and takeoff phase. The danger from a landing is increased because of the proximity to ground. Factors that can increase the possibility of an adverse event can include weather, a pilot's unfamiliarity with the topography around an airport, the layout of the runway(s), and the location of other airplanes within the landing pattern. Many but not all airports include dedicated Air Traffic Control (ATC) that serve to mitigate these factors. However, there are instances (e.g., because of understaffing or technical problems) in which ATC may not be available or have the capacity to assist all of the aircraft attempting to land. Consequently, there is a need to provide additional support to aircraft during landing in those instances in which ATC is not available.

SUMMARY

A method of assisting an aircraft in landing at an airfield employs one or more unmanned aerial vehicles (UAVs) having a ground map stored. A determination is made that the aircraft requires assistance landing at the airfield. Instructions are sent to the one or more UAVs to synchronize a flight path with the aircraft. The one or more UAVs receive sensor data regarding conditions surrounding the aircraft and the airfield. The aircraft is controlled by the one or more based upon the ground map, the flight characteristic profile, and the group map. The controlling of the aircraft by the one or more UAVs is discontinued upon the aircraft landing at the airfield.

Additionally, the controlling includes the one or more UAVs directly controlling the aircraft or providing instructions to be employed by a pilot of the aircraft, and the one or more UAVs are configured to communicate with the aircraft using a Very High Frequency (VHF) radio signal. The sensor data includes ground conditions and weather conditions. The one or more UAVs includes an edge UAV configured to provide computational assistance to one or more other UAVs of the one or more UAVs. Feedback is provided by one or both of the aircraft and the one or more UAVs. The flight characteristic profile is stored within the one or more UAVs.

A landing assist system includes an operations server system and one or more unmanned aerial vehicles (UAVs) having a ground map stored therein. The landing assist system is configured to perform the following. A determination is made that the aircraft requires assistance landing at an airfield. Instructions are sent to the one or more UAVs to synchronize a flight path with the aircraft. The one or more UAVs receive sensor data regarding conditions surrounding the aircraft and the airfield. The aircraft is controlled by the one or more based upon the ground map, the flight characteristic profile, and the group map. The controlling of the aircraft by the one or more UAVs is discontinued upon the aircraft landing at the airfield.

Additionally, the controlling includes the one or more UAVs directly controlling the aircraft or providing instructions to be employed by a pilot of the aircraft, and the one or more UAVs are configured to communicate with the aircraft using a Very High Frequency (VHF) radio signal. The sensor data includes ground conditions and weather conditions. The one or more UAVs includes an edge UAV configured to provide computational assistance to one or more other UAVs of the one or more UAVs. Feedback is provided by one or both of the aircraft and the one or more UAVs. The flight characteristic profile is stored within the one or more UAVs.

A computer program product comprises a computer readable storage medium having stored therein program code. The program code, which when executed by a landing assist system including one or more unmanned aerial vehicles (UAVs) having a ground map stored therein, causes the landing assist system to perform the following. A determination is made that the aircraft requires assistance landing at an airfield. Instructions are sent to the one or more UAVs to synchronize a flight path with the aircraft. The one or more UAVs receive sensor data regarding conditions surrounding the aircraft and the airfield. The aircraft is controlled by the one or more based upon the ground map, the flight characteristic profile, and the group map. The controlling of the aircraft by the one or more UAVs is discontinued upon the aircraft landing at the airfield.

Additionally, the controlling includes the one or more UAVs directly controlling the aircraft or providing instructions to be employed by a pilot of the aircraft, and the one or more UAVs are configured to communicate with the aircraft using a Very High Frequency (VHF) radio signal. The sensor data includes ground conditions and weather conditions. The one or more UAVs includes an edge UAV configured to provide computational assistance to one or more other UAVs of the one or more UAVs. Feedback is provided by one or both of the aircraft and the one or more UAVs. The flight characteristic profile is stored within the one or more UAVs.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
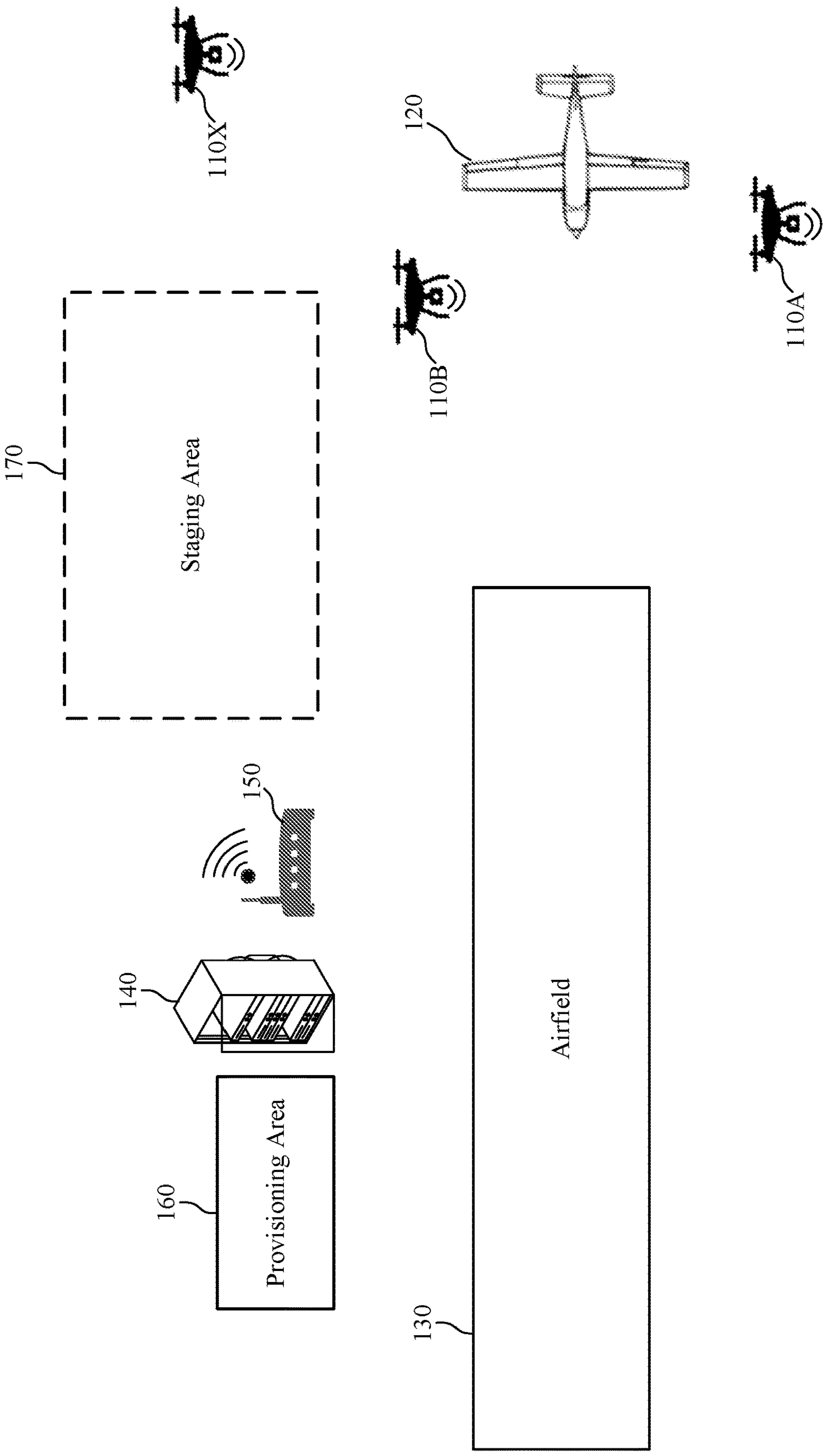
FIG. 1 is a block diagram illustrating an example architecture of an landing assist system according to an embodiment of the present invention.

FIG. 1 illustrate an exemplary landing assist system 100 for assisting an aircraft 120 to land at an airfield 130. Subsequently discussed in more detail with regard to FIG. 2, one or more unmanned aerial vehicles (UAVs) 110A-X having a ground map 242 stored therein are employed. A determination is made that an aircraft 120 requires assistance landing at the airfield 130. Instructions are sent to the one or more UAVs 110A-X to synchronize a flight path with the aircraft 120. The one or more UAVs 110A-X receive sensor data regarding conditions surrounding the aircraft 120 and the airfield 130. The aircraft 120 is controlled by the one or more UAVs 110A-X based upon the ground map 242, the flight path, and a flight characteristic profile 244 of the aircraft 120. The controlling of the aircraft 120 by the one or more UAVs 110A-X is discontinued upon the aircraft 120 landing at the airfield 130

The landing assist system 100 is not limited to any particular type of aircraft 120. By way of example, the landing assist system 100 can be employed with light aircraft, helicopters, and commercial aircraft. However, in certain aspects, the aircraft 120 preferably includes communication equipment capable of communicating with the UAVs 110A-X. Additionally, in certain aspects, the aircraft 120 is configured to be directly controlled by the UAVs 110A-X.

A UAV (commonly referred to a drone) is an unmanned vehicle that can be remotely controlled and/or fly autonomously. UAVs are commercially available, and the present landing assist system 100 is not limited as to a particular type of UAV. However, in certain aspects, the UAVs 110A-X employed by the landing assist system 100 are configured in the manner illustrated in FIG. 2, which is discussed in more detail below.

The landing assist system 100 is also capable of being using with any type of airfield 130. This can include primary and non-primary commercial service airports, reliever airports, cargo service airports, general aviation airports, seaplane airports, heliports, and private airports. Although not limited in this manner, the area associated with the airfield 130 can include a provisioning area 160 that is used to refuel/recharge/store the UAVs 110A-X as well as an aerial staging area 170 where already airborne UAVs 110A-X can be staged in preparation of being used by the landing assist system 100. In certain aspects, the staging area 170 is located outside of the airport pattern so as to prevent intrusion of the staged airborne UAVs 110A-X into active airspace.

An operations server system 140 and a ground-based communication system 150 can also be associated with the landing assist system 100. The operations server system 140 and the ground-based communication system 150 are not limited as to a particular type of hardware but are configured to manage and communicate with the one or more UAVs 110A-X. Additionally, the operations server system 140 can be configured to receive feedback from the one or more UAVs 110A-X and the aircraft 120 and subsequently analyze that feedback.

The operations server system 140 can include either as a separate component or integral therewith a provisioning system. In certain aspects, the provisioning system can operate on a platform agnostic hardware, be mobile, and/or be hosted from within a private enterprise network or in the cloud. The provisioning system can include all launch parameters for the UAVs 110A-X, which can be made available remotely and securely to the launch infrastructure associated with the provisioning area 160 and compliant with all Federal Aviation Administration (FAA) directives specifically for unmanned aircrafts when operating in the United States. Similar compliance can be driven by local aviation authorities for other countries.

Figure 2:
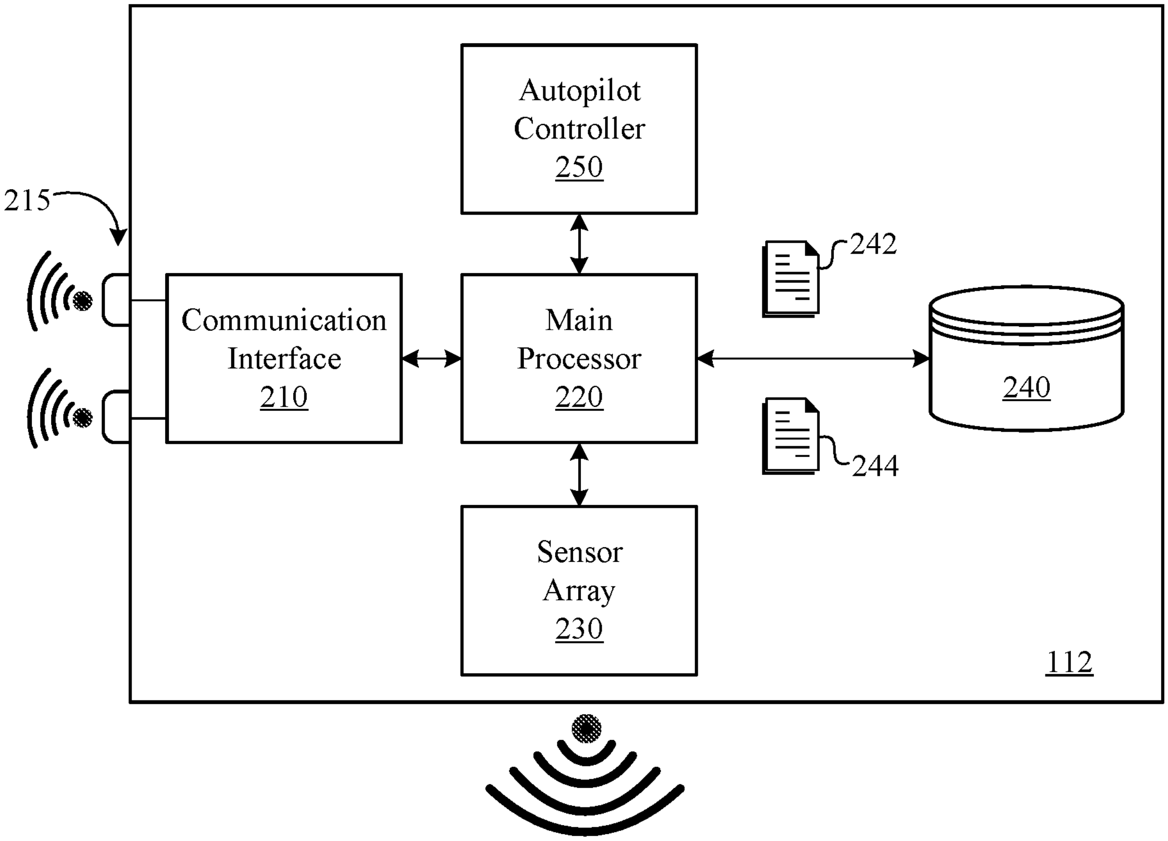
FIG. 2 is a block diagram illustrating certain components of an unmanned aerial vehicle of FIG. 1 according to an embodiment of the present invention.

FIG. 2 illustrates certain functional components of the UAVs 110A-X and can include a communication interface 210, main processor 220, sensor array 230, data storage 240, and autopilot controller 250. Other functional components of UAV 110A-X such as a power supply, flight controller, and propulsion system are well known and are omitted for sake of clarity.

The communication interface 210 is configured to permit the UAV 110A to communicate with ground (e.g., the operations server system 140 via the ground-based communication system 150) and the aircraft 120 as well as other UAVs 110A-X via one or more communication devices 215. Many types of communication devices 215 so capable are known, and the UAV 110A is not limited as to one or more of these particular types of communication devices 215. For example, the one or more communication device 215 can operate on dual frequencies (e.g., UHF and VHF). Additionally, the one or more communication devices 215 can be configured to operate along the same frequency used by ATC.

The sensor array 230 is configured to provide both geo-spatial and surrounding weather/environmental conditions and can include, but is not limited to, an altimeter, a global position system (GPS) receiver, optical receivers (e.g., video cameras), barometer, and Lidar (Light Detection and Ranging), as well as sensors used to determine atmospheric pressure, temperature, humidity, wind speed, and wind direction. Sensors capable of providing this data are well known and the sensor array 230 is not limited as to any particular type of sensors so capable.

The UAV 110A-X can also include one or more processors 220, 250. Although a main processor 220 and autopilot controller 250 are separately illustrated, these processors 220, 250 can be combined. The main processor 220 is configured to control the operations of the UAV 110A-X itself, whereas the autopilot controller 250 is configured to generate instructions for controlling the aircraft 120 based upon the weather conditions, intended flight path, the ground map 242, and the flight characteristic profile 244 for the aircraft 120. Both types of processors 220, 250 are well known and the UAV 110A-X is not limited as to a particular processor so capable.

Data storage 240 (e.g., one or more storage devices) can include one or more ground maps 242 and a flight characteristic profile 244 for the aircraft 120. The ground map 242 can include topographical characteristics of the airfield 130 and surrounding locations. The ground map 242 can also include one or more preferred flight paths to the airfield 130. Also, in certain aspects, the ground map 242 can include alternative locations outside of the airfield 130 for landing if, for example because of being low on fuel or because of a mechanical problem, the aircraft 120 is unable to reach the airfield 130. For example, this location could include a water landing or a landing on a field outside of the perimeter of the airfield 130. Additionally, the ground map 242 could be for a location not associated with an airfield 130. The flight characteristic profile 244 is specific to the type of the aircraft 120. For example, the flight characteristics of a 737 can be very different than the flight characteristics of a light general aviation aircraft.

Although not limited in this manner, the UAVs 110A-X provided for assisting an aircraft 120 can include an edge UAV 110X as a specialized UAV intended to provide additional computing processing to support the native processing provided in UAVs 110A, 110B. This UAV 110X can be configured with additional processors and/or storage capabilities and can be configured to communicate with the other UAVs 110A, 110B.

Figure 3:
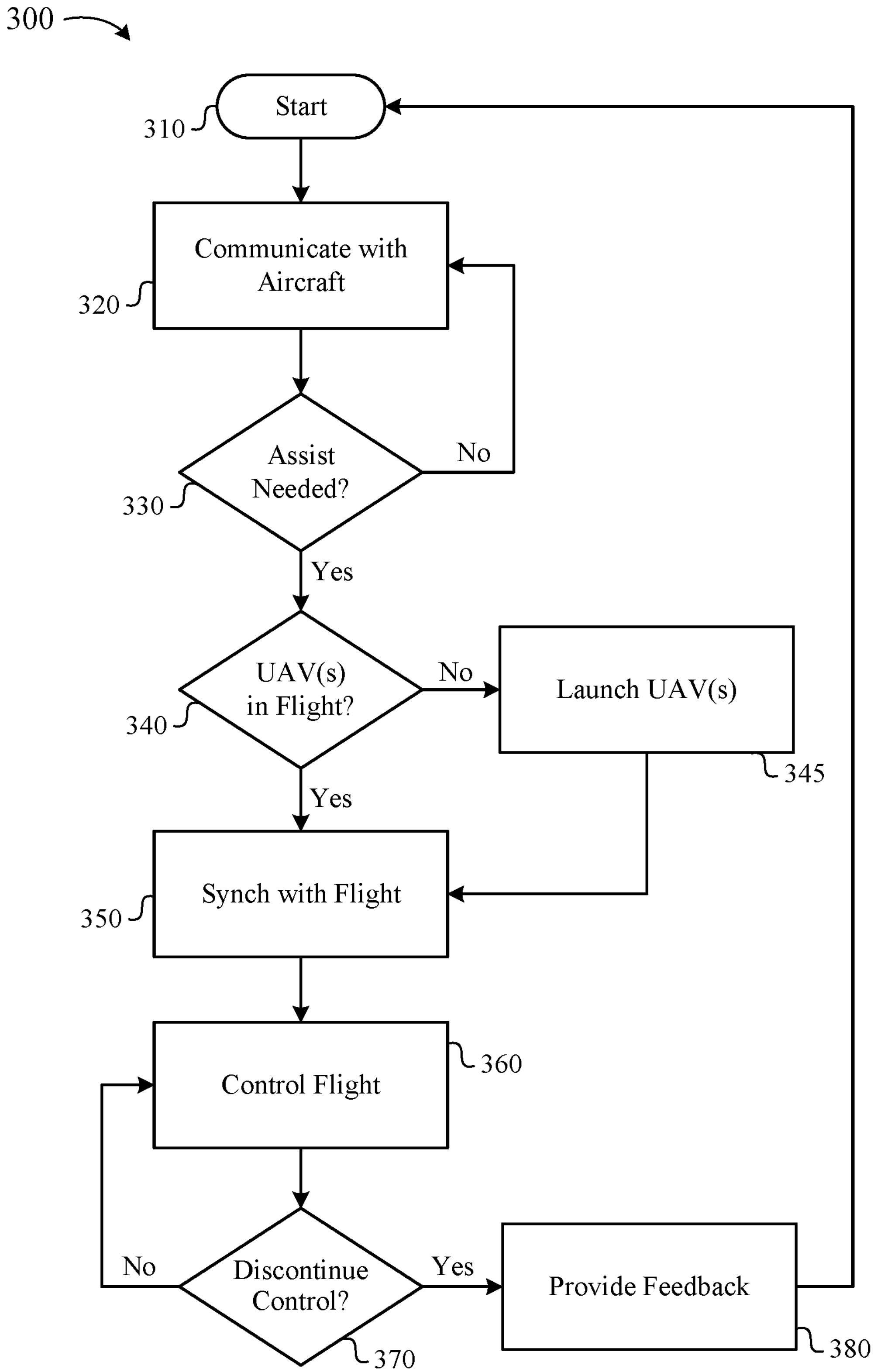
FIG. 3 is a block diagram illustrating an exemplary method of employing the landing assist system of FIG. 1 according to an embodiment of the present invention.

With reference to FIG. 3, an overview of the general process 300 for assisting the landing of an aircraft 120 using UAVs 110A-X by the landing assist system 100 is disclosed.

In 310, the process 300 begins. In 320, using the UAVs 110A-X and/or the ground-based communication system 150, communication is established with the aircraft 120. Many different technologies are known capable of communicating with the aircraft 120 and the landing assist system 100 is not limited as to a particular technology. For example, Automatic Dependent Surveillance-Broadcast (ADS-B) is a technology that can be used to provide aircraft type, heading (direction and velocity), current position, altitude, and destination of the aircraft 120.

In 330, a determination is made whether the aircraft 120 needs landing assistance. There can be many different approaches to making this determination. For example, a distress signal can be received from the aircraft 120. In addition to or alternatively, the determination can be based upon weather conditions (e.g., bad weather conditions, such a low visibility because of fog) may require the deployment of the landing assist system 100. In addition to or alternatively, the determination can be based upon the availability of ATC. Specifically, if ATC is not available or has reduced capacity and is unable to provide sufficient assistance, then a determination can be made to deploy the landing assist system 100 to aid the aircraft 120 in landing.

Once it has been determined that the aircraft 120 needs landing assistance, the number and/or type of UAVs 110A-X needed are determined/identified by the operations server system 140 and a determination is made whether these identified UAVs 110A-X are properly positioned and available. In 340, if the UAVs 110A-X are not already aloft, the process proceeds to 345 in which the UAVs 110A-X are instructed to launch and proceed to either the staging area 170 and/or a position along the flight path of the aircraft 120. During this time, if the UAVs 110A-X do not already contain the ground map 242 and the flight configuration profile 244 of the aircraft 120 being assisted, this data can be provided to the UAVs 110A-X by the operations server system 140 via the ground-based communication system 150.

In 350, the UAVs 110A-X are instructed to synch with the flight path of the aircraft 120 so to provide additional sensing capabilities (e.g., ground location as well as weather conditions). The synching with the flight path involves the UAVs 110A-X substantially matching the speed of the aircraft 120. This can be accomplished by the UAVs 110A-X speeding up to meet the speed of the aircraft 120, the aircraft 120 slowing down to meet the speed of the UAVs 110A-X, or a combination of both.

In 360, once positioned, the UAVs 110A-X are configured to control the flight of the aircraft 120 via the communication interface 210 which can include Very High Frequency (VHF) radio or any other appropriate technology. The control of the flight can be performed directly or indirectly. Indirect control involves providing instructions by the UAVs 110A-X to a pilot of aircraft 120 where direct control involves providing instructions by the UAVs 110A-X to an autopilot system of the aircraft 120. In either instance, the autopilot controller 250 of the UAVs 110A-X uses data from the sensor array 230, the ground map 242, and the flight configuration profile 244 of the aircraft 120 to determine the proper instructions that can be used to control the flight of the aircraft 120.

In 370, a determination is made whether to discontinue control of the aircraft 120, and this manner by which this determination is made is not limited as to a particular approach. For example, control can be discontinued based upon a request by the aircraft 120 to release control back to the pilot of the aircraft 120. As another approach, control can be discontinued based upon ATC becoming available (e.g., after not being available during approach of the aircraft 120 to the airfield 130). In yet another approach, control can be discontinued based upon the aircraft 120 landing and reaching a predefined location in the airfield 130, such as a particular apron, ramp, or gate. In still another approach, control can be discontinued based upon a determination that the UAVs 110A-X are unable to provide adequate flight control over the aircraft 120 based upon some determination (e.g., because of a technical failure or the UAVs 110A-X having insufficient power to continue their flight).

Once control has been discontinued and dependent upon the power level of UAVs 110A-X, the UAVs 110A-X can be directed to return to the aerial staging area 170 and subsequently be used to assist additional aircraft. Alternative, the UAVs 110A-X can be directed to return to a provisioning area 160 in which the UAVs 110A-X can be recharged/refueled. In 380, after control has been discontinued in 370, feedback can be provided from the UAVs 110A-X and/or aircraft 120 to the operations server system 140. Operations server system 140 is configured to adjust operations of the autopilot controller 250 based upon the feedback. Although not limited in this manner, the feedback can include operation metrics involving both the UAVs 110A-X and the aircraft 120. These operation metrics can include but are not limited to hardware performance, resource utilization, and need for additional resources. Additional operation metrics can include flight characteristics of the UAVs 110A-X and the aircraft 120, such as power usage of the individual UAVs 110A-X and how closely the aircraft 120 followed a predetermined flight path defined within the ground map 242. These operation metrics can be subsequently used by a neural network to identify patterns that can be used to determine how the UAVs 110A-X are deployed and modify the flight configuration profiles 244 for subsequent use by the UAVs 110A-X.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 4:
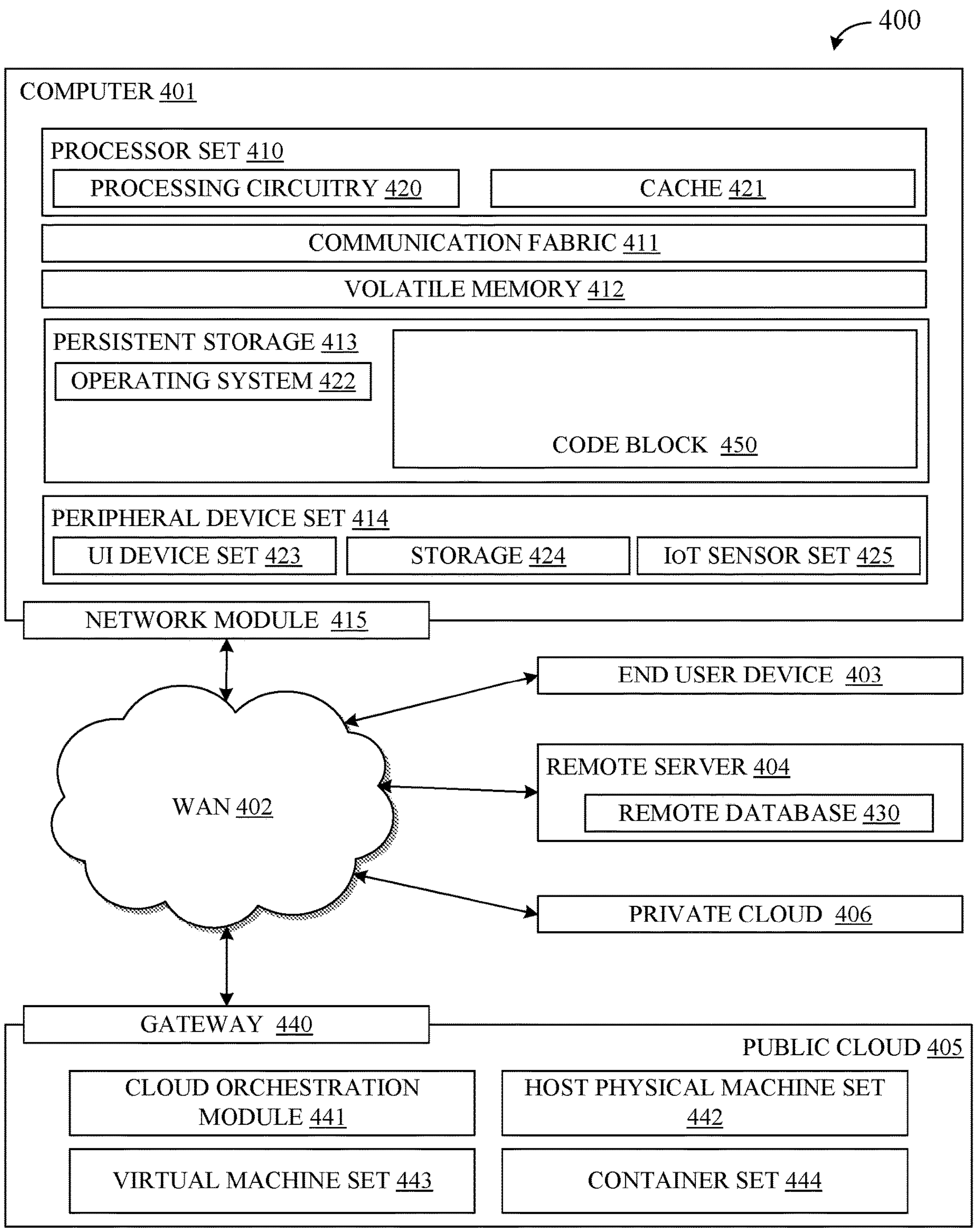
FIG. 4 is a block diagram illustrating an example of computer environment for implementing portions of the methodology of FIG. 3.

Referring to FIG. 4, computing environment 400 contains an example of an environment for the execution of at least some of the computer code involved in performing the inventive methods, such as code block 450 for implementing the operations of the landing assist system 100. Computing environment 400 includes, for example, computer 401, wide area network (WAN) 402, end user device (EUD) 403, remote server 404, public cloud 405, and private cloud 406. In certain aspects, computer 401 includes processor set 410 (including processing circuitry 420 and cache 421), communication fabric 411, volatile memory 412, persistent storage 413 (including operating system 422 and method code block 450), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. However, to simplify this presentation of computing environment 400, detailed discussion is focused on a single computer, specifically computer 401. Computer 401 may or may not be located in a cloud, even though it is not shown in a cloud in FIG. 4 except to any extent as may be affirmatively indicated.

Processor set 410 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In certain computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code block 450 in persistent storage 413.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 411 is the signal conduction paths that allow the various components of computer 401 to communicate with each other. Typically, this communication fabric 411 is made of switches and electrically conductive paths, such as the switches and electrically conductive paths that make up busses, bridges, physical input/output ports and the like. Other types of signal communication paths may be used for the communication fabric 411, such as fiber optic communication paths and/or wireless communication paths.

Volatile memory 412 is any type of volatile memory now known or to be developed in the future. Examples include dynamic type random access memory (RAM) or static type RAM. Typically, the volatile memory 412 is characterized by random access, but this is not required unless affirmatively indicated. In computer 401, the volatile memory 412 is located in a single package and is internal to computer 401. In addition to alternatively, the volatile memory 412 may be distributed over multiple packages and/or located externally with respect to computer 401.

Persistent storage 413 is any form of non-volatile storage for computers that is now known or to be developed in the future. The non-volatility of the persistent storage 413 means that the stored data is maintained regardless of whether power is being supplied to computer 401 and/or directly to persistent storage 413. Persistent storage 413 may be a read only memory (ROM), but typically at least a portion of the persistent storage 413 allows writing of data, deletion of data and re-writing of data. Some familiar forms of persistent storage 413 include magnetic disks and solid state storage devices. Operating system 422 may take several forms, such as various known proprietary operating systems or open source Portable Operating System Interface type operating systems that employ a kernel. The code included in code block 450 typically includes at least some of the computer code involved in performing the inventive methods.

Peripheral device set 414 includes the set of peripheral devices for computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some aspects, storage 424 may take the form of a quantum computing storage device for storing data in the form of qubits. In aspects where computer 401 is required to have a large amount of storage (for example, where computer 401 locally stores and manages a large database) then this storage 424 may be provided by peripheral storage devices designed for storing very large amounts of data, such as a storage area network (SAN) that is shared by multiple, geographically distributed computers. Internet-of-Things (IoT) sensor set 425 is made up of sensors that can be used in IoT applications. For example, one sensor may be a thermometer and another sensor may be a motion detector.

Network module 415 is the collection of computer software, hardware, and firmware that allows computer 401 to communicate with other computers through a Wide Area Network (WAN) 402. Network module 415 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 415 are performed on the same physical hardware device. In other aspects (for example, aspects that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any Wide Area Network (for example, the internet) capable of communicating computer data over non-local distances by any technology for communicating computer data, now known or to be developed in the future. In some aspects, the WAN 402 ay be replaced and/or supplemented by local area networks (LANs) designed to communicate data between devices located in a local area, such as a Wi-Fi network. The WAN 402 and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In certain aspects, EUD 403 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404. As defined herein, the term "server" means a data processing system configured to share services with one or more other data processing systems.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other aspects, a private cloud 406 may be disconnected from the internet entirely (e.g., WAN 402) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 405 and private cloud 406 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A method employing one or more unmanned aerial vehicles (UAVs) having a ground map stored therein, comprising:

determining that an aircraft requires assistance landing at an airfield;

sending instructions to the one or more UAVs to synchronize a flight path with the aircraft;

receiving, by the one or more UAVs, sensor data regarding conditions surrounding the aircraft and the airfield;

providing, by the one or more UAVs and to an autopilot system of the aircraft, instructions associated with controlling the aircraft based upon the ground map and the flight path;

controlling, by the one or more UAVs, the aircraft based on providing the instructions associated with controlling the aircraft to the autopilot system of the aircraft; and discontinuing the controlling, by the one or more UAVs, based upon the aircraft landing at the airfield.

2. The method of claim 1, wherein the controlling includes the one or more UAVs:

directly controlling the aircraft, or providing instructions to be employed by a pilot of the aircraft.

3. The method of claim 2, wherein the one or more UAVs are configured to communicate with the aircraft using a Very High Frequency (VHF) radio signal.

4. The method of claim 1, wherein the sensor data includes ground conditions.

5. The method of claim 1, wherein the sensor data includes weather conditions.

6. The method of claim 1, wherein the one or more UAVs includes an edge UAV configured to provide computational assistance to one or more other UAVs of the one or more UAVs.

7. The method of claim 1, wherein feedback is provided by one or both of the aircraft and the one or more UAVs.

8. The method of claim 1, wherein discontinuing the controlling is based on a request by the aircraft to release control back to a pilot of the aircraft.

9. A landing assist system, comprising:

one or more unmanned aerial vehicles (UAVs) having a ground map stored therein, wherein the landing assist system is configured to perform:

determining that an aircraft requires assistance landing at an airfield;

sending instructions to the one or more UAVs to synchronize a flight path with the aircraft;

receiving, by the one or more UAVs, sensor data regarding conditions surrounding the aircraft and the airfield;

providing, by the one or more UAVs and to an autopilot system of the aircraft, instructions associated with controlling the aircraft based upon the ground map and the flight path;

controlling, by the one or more UAVs, the aircraft based on providing the instructions associated with controlling the aircraft to the autopilot system of the aircraft; and discontinuing the controlling, by the one or more UAVs, based upon the aircraft landing at the airfield.

10. The landing assist system of claim 9, wherein the controlling includes the one or more UAVs:

directly controlling the aircraft, or providing instructions to be employed by a pilot of the aircraft.

11. The landing assist system of claim 10, wherein the one or more UAVs are configured to communicate with the aircraft using a Very High Frequency (VHF) radio signal.

12. The landing assist system of claim 9, wherein the sensor data includes ground conditions.

13. The landing assist system of claim 9, wherein the sensor data includes weather conditions.

14. The landing assist system of claim 9, wherein the one or more UAVs includes an edge UAV configured to provide computational assistance to one or more other UAVs of the one or more UAVs.

15. The landing assist system of claim 9, wherein feedback is provided by one or both of the aircraft and the one or more UAVs.

16. The landing assist system of claim 9, wherein discontinuing the controlling is based on a request by the aircraft to release control back to a pilot of the aircraft.

17. A non-transitory computer readable storage medium having stored therein a computer program product, the computer program product comprising:

program code, which when executed by a landing assist system including one or more unmanned aerial vehicles (UAVs) having a ground map stored therein, causes the landing assist system to perform:

determining that an aircraft requires assistance landing at an airfield;

sending instructions to the one or more UAVs to synchronize a flight path with the aircraft;

receiving, by the one or more UAVs, sensor data regarding conditions surrounding the aircraft and the airfield;

providing, by the one or more UAVs and to an autopilot system of the aircraft, instructions associated with controlling the aircraft based upon the ground map and the flight path;

controlling, by the one or more UAVs, the aircraft based on providing the instructions associated with controlling the aircraft to the autopilot system of the aircraft; and discontinuing the controlling, by the one or more UAVs, based upon the aircraft landing at the airfield.

18. The non-transitory computer readable storage medium of claim 17, wherein the controlling includes the one or more UAVs:

directly controlling the aircraft, or providing instructions to be employed by a pilot of the aircraft, and the one or more UAVs are configured to communicate with the aircraft using a Very High Frequency (VHF) radio signal.

19. The non-transitory computer readable storage medium of claim 17, wherein the sensor data includes ground conditions and weather conditions.

20. The non-transitory computer readable storage medium of claim 17, wherein the one or more UAVs includes an edge UAV configured to provide computational assistance to one or more other UAVs of the one or more UAVs.

* * * * *